Patented Apr. 15, 1947

2,418,818

UNITED STATES PATENT OFFICE 2,418,818

PACKAGING MATERIAL AND PROCESS COVERED THEREBY

Mayne R. Coe, Washington, D. C., assignor to Rile-Coe Filter Process, Inc., Dover, Del., a corporation of Delaware No Drawing. Application August 14, 1941, Serial No. 406,909

14 Claims. (Cl. 99—171)

This invention relates to packaging material which acts as a color screen for shielding commodities that are affected by light. More specifically, it is a color screen which absorbs all of the ultra-violet, violet, and blue, as well as a substantial amount of light in the region delimited by 6300 to 6700 angstrom units of the spectrum.

Such a screen has been found very effective for enclosing and/or shielding commodities which are affected by light in the region below 4900 angstrom units and in the region delimited by 6300–6700 angstrom units, and hence is effective in the case of growing commodities which are mature or which are approaching the maturing stage, since they naturally absorb copious amounts of light in the blue region of the spectrum as well as absorb a lesser amount of light in the red region of the spectrum.

Flowering plants, as well known, depend on sunlight for the advancement of the blooming stage, and by this invention such advancement may be controlled (delayed or lengthened) to meet the intended use of and/or the market for the flowers. For example, Easter lilies, poinsettias, and other seasonal flowers may be delayed from blooming too soon if the sheet material herein described is used to enclose the whole plant or the bud.

Rubber goods are prevented from losing their elasticity, and rubber tires retain their resiliency for a much longer period, if wrapped with the sheet material herein described.

Enclosing tobacco in containers made of the herein disclosed sheet material either during the curing stage of the tobacco or after the formation thereof into tobacco products as when packaged for consumption, prevents the decomposition of nicotine salts, and thus prevents the production of volatile nicotine and other throat irritating substances.

It has been found that certain other products than those containing chlorophyll absorb light practically in the same regions. Meat and meat products containing blood or haemoglobin in varying amounts, porphyrins, and also substances containing vitamins, especially carotene (pro-vitamin "A") and "C," and substances containing enzymes, especially catalase, for example. These substances occur in nature and thus are susceptible to light. It has been found by experiment that when they are deprived of their living environment, they retain their natural characteristics and potency if shielded from light below 4900 angstrom units and from light delimited by 6300 to 6700 angstrom units of the spectrum.

I have found that those wave lengths of light which are most harmful to rubber or rubber products, as well as to tobacco and tobacco products, to meat or meat products, to vitamins, to enzymes and/or porphyrins, and those wave lengths of light which are most effective in producing ripening or maturing of fruits, vegetables, flowers, etc., are those wave lengths lying in the region below 4900 angstrom units as well as lying in the region 6300 to 6700 angstrom units, and that the other wave lengths of the spectrum are not deleterious or harmful to these said products. Therefore it follows that when a color screen is interposed between the light source and said products or commodities, to intercept and absorb said harmful and deleterious wave lengths of light, said products are improved, enhanced, protected, and/or their maturity is controlled as desired.

In the practice of this invention, there is provided a color screen as a shielding element for unripe fruits and vegetables, for flowering plants, for rubber and rubber products, for tobacco and tobacco products, for meat or meat products, for vitamins, for enzymes and/or porphyrins, which color screen may be of any suitable material which is translucent, as for example paper, or substantially transparent, but which is definitely absorbent of light having wave lengths below 4900 angstrom units and absorbent of wave lengths lying in the region between 6300 and 6700 angstrom units and therefore to which wave lengths of light the material is substantially opaque. It will be understood on the other hand that an otherwise completely transparent material may be used which however has been combined, impregnated, and/or coated with a substance such as to make the material a color screen which is substantially absorbent of or opaque to light as delimited in the preceding sentence. Such a colored or dyed material is also characterized by effecting a retardation of the ripening of fruits and vegetables, of the blooming of flowering plants, of the deterioration of rubber, the production of throat irritating substances in tobacco and by retaining the natural characteristics (color, etc.) of meat, meat products and porphyrins, as well as the potency of vitamins and enzymes.

It is desired to be emphasized that the dyestuffs and/or coloring substances which may be utilized, in producing such a color screen, are selected without regard for the visual color effect but rather for their light absorptive characteristics in the ultra-violet, violet, and blue regions of the spectrum, and also in the region delimited by 6300 to 6700 angstrom units. Further and more specifically they are, for example only, a suitable yellow combined with malachite green, or chlorophyll. The necessary concentration of the dyestuff is dictated by the purpose for which the sheet material is to be used.

The effective element of the present invention may be utilized in various forms, as protection shields, plates, caps, tubing, bands, wrapping blanks, bags, and formed containers such as bottles, cartons, boxes, packs, including linings of bags and formed containers.

In a preferred embodiment, the novel and improved article of the invention is in the form of a transparent cigarette pack, comprising a flexible sheet of any of the transparent sheet materials, used in the packaging field, combined with a suitable dye-stuff or pigment in sufficient combinations to render the sheet substantially opaque to light waves lying in the region below 4900 angstrom units and in the region delimited by 6300 to 6700 angstrom units of the spectrum.

The protective element is characterized by the property it has of preventing or delaying the photo-chemical action of light with respect to the ripening of fruits and vegetables; or maturing to the flowering of plants in general but more especially hot-house plants that are grown for maturity at certain seasons or on certain occasions; to the deterioration of rubber; to the formation of the irritating and poisonous constituents produced in tobacco through the effect of light, among which are volatile nicotine and tarry substances; and of retaining their natural characteristics and potency if shielded from light below 4900 angstrom units and from light delimited by 6300 to 6700 angstrom units of the spectrum.

The novel feature of the present invention over other known art in this field, is pertinent and specific to the region of light absorptions below 4900 and the region delimited by 6300 to 6700 angstrom units in combination with the transmission of all other light.

Vegetable oils contain the pigment chlorophyll which accounts for the spectral absorption by the oil of wave lengths of light below 4900 angstrom units as well as in the region delimited by 6300 to 6700 angstrom units. The color screen used in the present invention has the property of protecting the oil from deterioration through the development of rancidity, and is an improvement over that disclosed in the Coe Patent 1,880,813 in that a higher degree of transparency is obtained by this present invention, and there is provided a color screen which is more appealing to the eye from a sales point of view.

This same chlorophyll pigment is present in unripened fruits and vegetables, as well as in the stage of early flowering of plants, and also in rubber. In the curing of tobacco, and in the preparation of tobacco products chlorophyll is also present. Chlorophyll is the photo-sensitizer for the chemical action in plant life brought about in the presence of light. Haemoglobin in meat and meat products has practically the same absorption characteristics as chlorophyll, and also acts as a photosensitizer when exposed to light. Vitamins and enzymes are in commodities containing the following photosensitizers namely, porphyrins including chlorophyll and haemoglobin, as well as other photosensitizers, and therefore the characteristics and potency of vitamins and enzymes are more or less controlled by the presence of such photosensitizers. Therefore the present invention provides a color screen which has for its function the property of absorbing substantially the same light as is absorbed by nature in growing vegetation and in meat and meat products.

The well-known Grotthus-Draper law states that where there is photochemical absorption there is usually photochemical action, which may and usually does result deleteriously in the case of fruits, vegetables, meats, etc. As a result of numerous experiments, I have discovered that each of malachite green, monastrel green, or fast green (A–5832), with the addition of a suitable yellow dye or pigment, can be used to produce a color screen having a spectral absorption in the regions specified above.

The effectiveness of my color screen does not depend on the color as seen by the eye, but on the spectral properties of this screen as hereinabove stated. Suitable dye-stuffs and coloring matters for use in this invention are those which absorb appreciably, or are substantially opaque to, the wave lengths of light in the ultra-violet, violet, and blue regions and in the region delimited by 6300 to 6700 angstrom units of the spectrum.

The dye-stuff or coloring matter may be incorporated in the screen material either during or after the manufacture thereof. It is preferred that the dye-stuff, or the coloring matter, or the light absorbing material be present in this protective element in such a concentration that the light transmission in the specified regions of absorption is not greater than 10% and preferably less than 5%, i. e. in the region below 4900 angstrom units and is preferably less than 10% in the region delimited by 6300 to 6700 angstrom units.

The color screen may comprise materials normally translucent or transparent to visible light; for example, glass, glassine, synthetic plastics, gelatine, casein, synthetic resins of various types, non-fibrous cellulosic materials as regenerated cellulose, and cellulose derivatives, as cellulose esters, cellulose ethers, and cellulose oxy-ethers; or composite materials containing two or more of the above mentioned substances, viz. impregnated and/or coated materials, such as lacquered glass or lacquered regenerated cellulose, as well as laminated products comprising laminated glass, paper, textiles (especially silk), and the like.

Although the above remarks have applied more especially to the case where the dye-stuff is combined with, dyed or impregnated in, the shielding element, the invention also contemplates employing a protective element which may be coated with a substance or material rendering the element substantially opaque to light below 4900 angstrom units and also to light of the region of the visible spectrum delimited by 6300 to 6700 angstrom units.

In carrying on my experiments since the issuance of my Patent 1,880,813, I have discovered that the products hereinbefore mentioned, as well as oils, fats, and waxes, need not have excluded therefrom all light having wave lengths above 5600 angstrom units and in fact beneficial results have been obtained by extending the region of transmission from 4900 upwards with the exception of a critical region substantially delimited by 6300 to 6700 angstrom units. This region 6300 to 6700 has been proved to be critical in that it constitutes the substantial equivalent of nature's chlorophyll, and/or haemoglobin, and hence the resultant color screen should have a pigmentation or color which will absorb wave lengths of light lying in this critical region.

In addition to the specific commodities hereinbefore recited, there is contemplated also fruit juices (fermented, unfermented, natural, synthetic, and/or processed), silk, eggs, pharmaceuticals, bakery products, fish, dairy products, chicle and chicle products, latex and rubber-like products, which contain porphyrins and other light sensitive constituents, and which retain their natural properties of color, taste, aroma, and potency when processed and/or shielded by the screen element herein described.

It is obvious that those skilled in the art may vary the details of construction as well as the arrangements of parts constituting the articles of this invention, as well as vary the steps and combinations of steps constituting the method covered by this invention, without departing from the spirit of this invention and therefore it is desired not to be limited to the exact foregoing disclosure, except as may be required by the claims.

What is claimed is:

1. The process of inhibiting deleterious photochemical action in commodities of the genus Flora which normally would result from the absorption thereby of certain wave lengths of light, which comprises shielding the commodity from rays of light with a material such as to admit to the commodity those wave lengths of light between approximately 4900 and 6300 as well as above approximately 6700 angstrom units, while excluding wave lengths of light in all other regions.

2. The process of retarding the ultimate maturity of a fruit product, which comprises shielding the fruit from rays of light with a material such as to admit to the product those wave lengths of light between approximately 4900 and 6300 as well as above approximately 6700 angstrom units, while excluding wave lengths of light in all other regions.

3. The process of retarding the ultimate maturity of a vegetable product, which comprises shielding the vegetable from rays of light with a material such as to admit to the product those wave lengths of light between approximately 4900 and 6300 as well as above approximately 6700 angstrom units, while excluding wave lengths of light in all other regions.

4. The process of retarding the ultimate maturity of a flower product, which comprises shielding the flower from rays of light with a material such as to admit to the product those wave lengths of light between approximately 4900 and 6300 as well as above approximately 6700 angstrom units, while excluding wave lengths of light in all other regions.

5. The process of inhibiting deleterious photochemical action in fruit juices which normally would result from the absorption thereby of certain wave lengths of light, which comprises shielding the fruit juice from rays of light with a material such as to admit to the fruit juice those wave lengths of light between approximately 4900 and 6300 as well as above approximately 6700 angstrom units, while excluding wave lengths of light in all other regions.

6. An article of commerce comprising a commodity of the genus Flora, a material shielding said commodity from rays of light, said material having the property of admitting to the commodity those wave lengths of light between approximately 4900 and 6300 as well as above approximately 6700 angstrom units while excluding wave lengths of light in all other regions.

7. An article of commerce comprising a fruit product, a material shielding said fruit product from rays of light, said material having the property of admitting to the fruit those wave lengths of light between approximately 4900 and 6300 as well as above approximately 6700 angstrom units while excluding wave lengths of light in all other regions.

8. An article of commerce comprising a vegetable product, a material shielding said vegetable product from rays of light, said material having the property of admitting to the vegetable those wave lengths of light between approximately 4900 and 6300 as well as above approximately 6700 angstrom units while excluding wave lengths of light in all other regions.

9. An article of commerce comprising a growing plant product, a material shielding said growing plant product from rays of light, said material having the property of admitting to the growing plant those wave lengths of light between approximately 4900 and 6300 as well as above approximately 6700 angstrom units while excluding wave lengths of light in all other regions.

10. An article of manufacture comprising fruit juices packaged in a container to shield said juices from rays of light, said container having the property of admitting to the fruit juices those wave lengths of light between approximately 4900 and 6300 as well as above approximately 6700 angstrom units while excluding wave lengths of light in all other regions.

11. An article of commerce comprising a commodity of the genus Flora and a light shielding enclosing wrapper therefor, said wrapper being such as to admit to the commodity those wave lengths of light between approximately 4900 and 6300 as well as above approximately 6700 angstrom units while excluding wave lengths of light in all other regions.

12. An article of commerce comprising a fruit product and a light shielding enclosing wrapper therefor, said wrapper being such as to admit to the fruit product those wave lengths of light between approximately 4900 and 6300 as well as above approximately 6700 angstrom units while excluding wave lengths of light in all other regions.

13. An article of commerce comprising a vegetable product and a light shielding enclosing wrapper therefor, said wrapper being such as to admit to the vegetable product those wave lengths of light between approximately 4900 and 6300 as well as above approximately 6700 angstrom units while excluding wave lengths of light in all other regions.

14. An article of commerce comprising a growing plant and a light shielding enclosing wrapper therefor, said wrapper being such as to admit to the growing plant those wave lengths of light between approximately 4900 and 6300 as well as above approximately 6700 angstrom units while excluding wave lengths of light in all other regions.

MAYNE R. COE.

REFERENCES CITED

The following references are of record in the file of this patent:

UNITED STATES PATENTS

| Number | Name | Date |
|---|---|---|
| 1,880,813 | Coe | Oct. 4, 1932 |
| 2,042,333 | Coe | May 26, 1936 |
| 2,043,860 | Morgan | June 9, 1936 |
| 2,058,786 | Grant | Oct. 27, 1936 |
| 2,158,610 | Coe | May 16, 1939 |
| 2,038,114 | Joseph | Apr. 21, 1936 |
| 2,062,179 | Hunter | Nov. 24, 1936 |

OTHER REFERENCES

Ind. & Eng. Chem., Aug. 1933, vol. 25, pages 932-4.

"Wratten Light Filters," Eastman Kodak Company, Rochester, New York, 1929; pages 36, 43, 45 and 46.

"History of Three-Color Photography," Wall, publication by American Photographic Publishing Company, 1925; pages 71 and 77.